Oct. 19, 1965    J. R. WILLIAMS ETAL    3,212,526
RATIO ADJUSTING MECHANISM FOR GAS MIXING MACHINES
Filed April 29, 1963    2 Sheets-Sheet 1

INVENTOR
JOHN R. WILLIAMS
HENRY J. BRUSCA
BY
*E. W. Mason*
ATTORNEY.

Oct. 19, 1965  J. R. WILLIAMS ETAL  3,212,526
RATIO ADJUSTING MECHANISM FOR GAS MIXING MACHINES
Filed April 29, 1963  2 Sheets-Sheet 2

INVENTORS.
JOHN R. WILLIAMS
HENRY J. BRUSCA
BY

ATTORNEY.

United States Patent Office 3,212,526
Patented Oct. 19, 1965

3,212,526
RATIO ADJUSTING MECHANISM FOR GAS
MIXING MACHINES
John R. Williams, Ambler, and Henry J. Brusca, Huntingdon Valley, Pa., assignors to Selas Corporation of America, a corporation of Pennsylvania
Filed Apr. 29, 1963, Ser. No. 276,264
3 Claims. (Cl. 137—625.41)

The present invention relates to adjustment mechanisms, and more particularly to adjustment mechanisms that can be used with a gas-air mixing machine to adjust, either manually or automatically, the ratio of gas and air produced thereby.

Industrial burners frequently are supplied with fuel in the form of a combustible mixture of gas and air. The mixture is supplied by a mixing machine that must have adjustments in it whereby the ratio of the gas and air in the mixture can be varied. Frequently it is difficult to make these adjustments accurately or while the machine is in operation.

It is an object of the present invention to provide an adjusting mechanism for a gas-air mixing machine that will be accurate, that can be operated either manually or automatically, and which can be operated while the machine is in operation.

It is a further object of the invention to provide mechanism accurately to adjust a plurality of parts relatively to each other, either manually or automatically.

The invention includes an adjusting element that is attached to the part to be moved, which part, in turn, can be accurately moved to a desired position by manual means. This manual means is moved in its entirety by a second means which may be automatically controlled from a remote point. The mechanism is designed so that the adjusting element can extend into an enclosed space, while it can be adjusted manually or automatically from outside said space.

The various features of novelty which characterize our invention are pointed out with particularity in the claims annexed to and forming a part of this specification. For a better understanding of the invention, however, its advantages and specific objects attained wtih its use, reference should be had to the accompanying drawings and descriptive matter in which we have illustrated and described a preferred embodiment of the invention.

Figure 1:
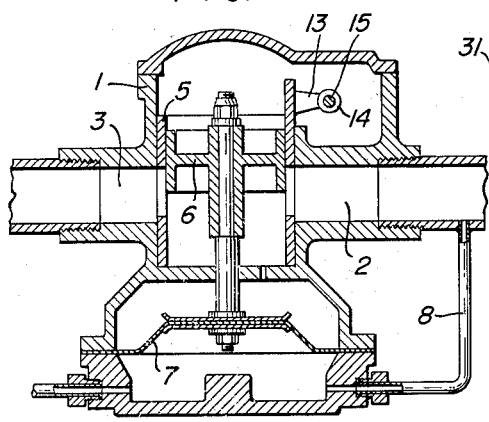
FIG. 1 is a section through a machine for mixing gas and air.
Figure 2:
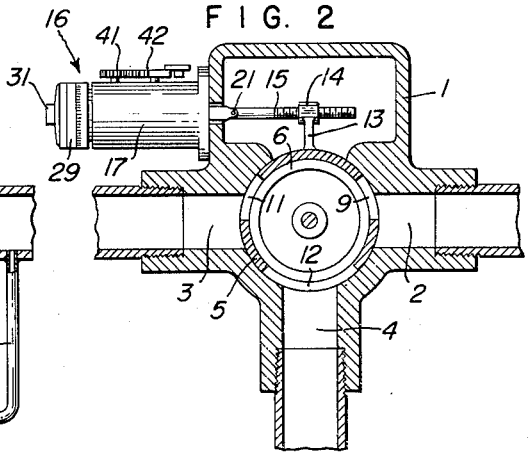
FIGURE 2 is a plan section of the apparatus with the yoke rotated 90° in the interest of clarity.

FIGS. 1 and 2 show somewhat diagrammatically a mixing machine of the type on which the adjusting mechanism of the invention can be used. Such a machine includes a frame in the form of a casting 1 that is provided with an air inlet 2, a gas inlet 3 and a mixture outlet 4 that is connected by a suitable pump (not shown) to burners which are to be supplied with a combustible mixture produced by the machine. The mixing machine is provided with a ratio adjusting sleeve 5 and a volume adjusting piston 6. The piston is connected to and moves with a diaphragm 7. Sleeve 5 is provided with an air port 9 and a gas port 11 through which gas and air, respectively, are drawn into the space below the piston. This sleeve is also provided with a port 12 through which the mixture can flow from this space through outlet 4 and to the burners. Sleeve 5 is rotated in opposite directions in order to vary the respective areas of ports 9 and 11 and thereby the ratio of the air and gas supplied as a mixture. An air passage 8 connects the air supply line with a space below the diaphragm 7 so that this space will be kept at atmospheric pressure. As the burners require more or less fuel, the space between piston 6 and above diaphragm 7, which are connected by a port in the frame, will vary in pressure with respect to atmospheric, causing the piston to rise or fall to supply the correct amount of mixture by varying the opening of ports 9 and 11.

Sleeve 5 is rotated by an arm 13 that has pivoted to it a nut 14 into which is threaded an adjustable rod 15. This pivoted connection is similar to the connection shown at 21 in FIGURE 3. As the rod is moved axially, sleeve 5 will be rotated. This sleeve will also be rotated if the rod is held against axial movement and rotated to adjust the position of nut 14 along it. Rod 15 is moved axially and is rotated by an adjusting mechanism 16, shown in FIGS. 3 and 4.

The adjusting mechanism consists of a bracket in the form of a casting 17 that is bolted to casting 1. This bracket is provided with a bushing 18 through which a rod 19 extends, with this rod being able to move both axially and rotatably. Rod 19 actually forms an extension of rod 15 and is connected to rod 15 by a joint 21 which will permit rod 19 to rotate rod 15 even if they are slightly out of axial alignment. The bushing is provided with an O-ring 22 in order to make a gas tight fit between rod 19 and the bushing.

Figure 3:
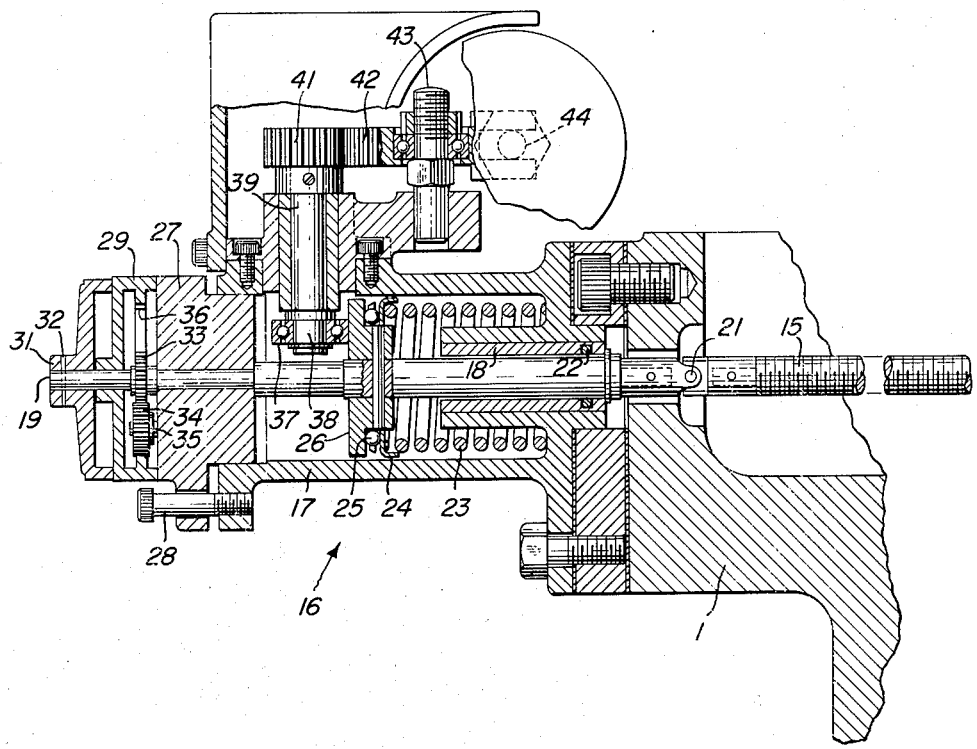
FIG. 3 is a section through the adjusting mechanism.

Rod 19 and the parts attached thereto are normally biased to the left in FIG. 3 by a spring 23, one end of which engages against a portion of bracket 17, and the other end of which engages a spring retainer 24. The retainer bears against a bearing 25 which is supported by a thrust member in the form of a radially extending disc 26 that is pinned to rod 19. Intermediate its ends rod 19 has journaled on it an index member 27 that moves axially with the rod but is prevented from rotating by a bolt 28 that extends through an opening in member 27 and which is threaded into bracket 17.

The position of rod 19 and thereby the postion of sleeve 5 is indicated by a member 29 which is rotatable on rod 19 and is held in place thereon by means of an adjusting knob 31 fastened to rod 19 by a pin 32.

Figure 4:
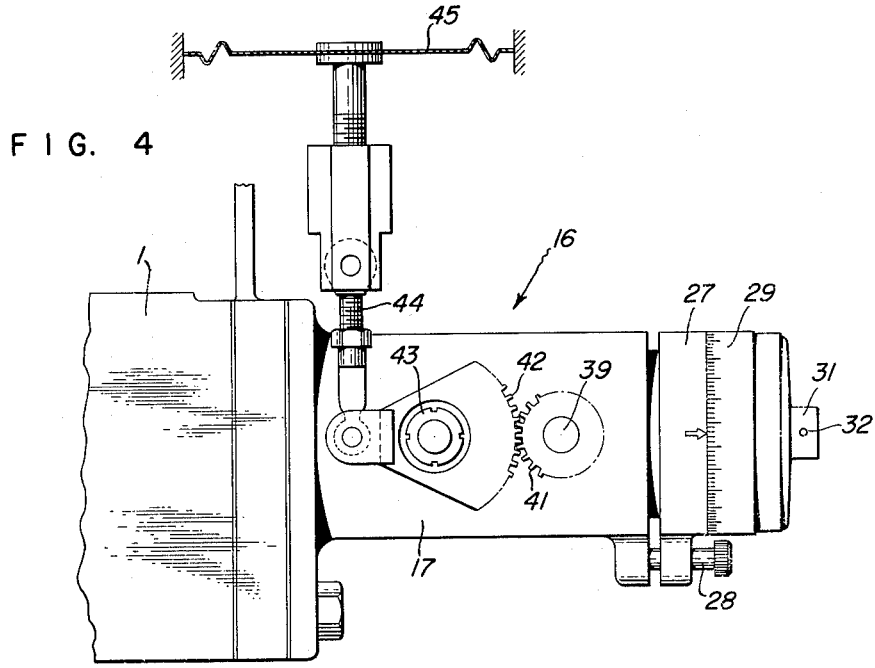
FIG. 4 is a side view of the adjusting mechanism showing a pneumatic operator.

As knob 31 is rotated to adjust rod 15 and sleeve 5, its position is indicated by the position of member 29 with respect to member 27. This is accomplished by a pinion 33, fastened to rod 19, that meshes with a second pinion 35 which rotates around a stub shaft 35 on member 27. Rotation of rod 19 and pinion 33 act to rotate member 29 through an internal gear 36 formed on the inner surface of that member. It will be seen that as the adjusting knob 31 is rotated, rod 15 will be rotated to move nut 14 along this rod and thereby rotate sleeve 5 to adjust the relative position of ports 9 and 11 with respect to passages 2 and 3, thereby to vary the ratio of the air and gas. Suitable indicating marks can be placed on members 29 and 27, as shown in FIG. 4, in order to indicate the position of sleeve 5. These marks can be calibrated in air-gas ratio.

The entire assembly can be moved axially in order to adjust sleeve 5 by some suitable control means. This is accomplished by moving rod 19 axially against the bias of spring 23. To this end there is provided a roller 37 engaging the left face of disc 26. This roller is mounted on a portion 38 of a shaft 39 which is eccentric with respect to the shaft so that, as the shaft is rotated, roller 37 will move the disc, in the fashion of a cam, in an axial direction.

Shaft 39 is rotated by a pinion 41 attached to one end thereof which is engaged by a rack 42 on the edge of a lever that is pivoted at 43. The lever is moved around its pivot by a link 44, the upper end of which is shown as being attached to a diaphragm 45. This diaphragm can form a portion of any conventional pneumatically operated control devise. For example, the temperature of a furnace heated by the burners supplied by the mixture can be measured in a conventional manner. The temperature measuring and control instrument can be used with a normal pneumatic control system to vary the pressure applied on diaphragm 45 to move lever 42.

Figure 5:
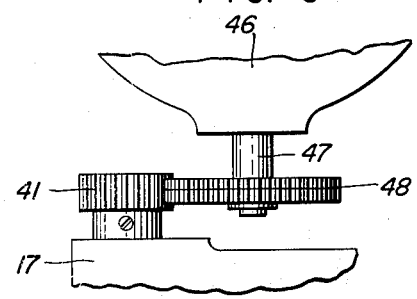
FIG. 5 is a view showing a motor operator.

Shaft 39 can also be rotated by a motor which is adjusted electrically from a conventional control instrument. Referring to FIG. 5 it will be seen that a motor 46 has a shaft 47 with anti-backlash gears 48 which mesh with pinion 41. As motor 46 is energized in response to control impulses from a control instrument, pinion 41 will be rotated.

In the operation of apparatus, knob 31 is adjusted to position sleeve 5 so that the desired ratio of gas and air will be produced by the mixing machine. Thereafter, minor variations in the pressure of the gas, or its heat content, can cause variations in the heating effects of the mixture produced by the machine. These effects can be measured by any conventional temperature or atmosphere responsive device. These variations are then applied through a control instrument of any suitable type to produce pneumatic or electrical impulses to rotate pinion 41. This rotation is translated through the cam effect of roller 37 to move rod 19 and the parts attached thereto in an axial direction. Normally this adjustment will be considerably smaller than the initial adjustment made by knob 31. Therefore, it will be seen that the adjusting mechanism is used to give a manually determined initial position to sleeve 5 for an initial adjustment of the ratio of the mixture produced by the mixing machine. Small adjustments that are needed from time to time as the system is operating, are applied automatically by moving the entire manual adjusting portions of the apparatus.

Figure 6:
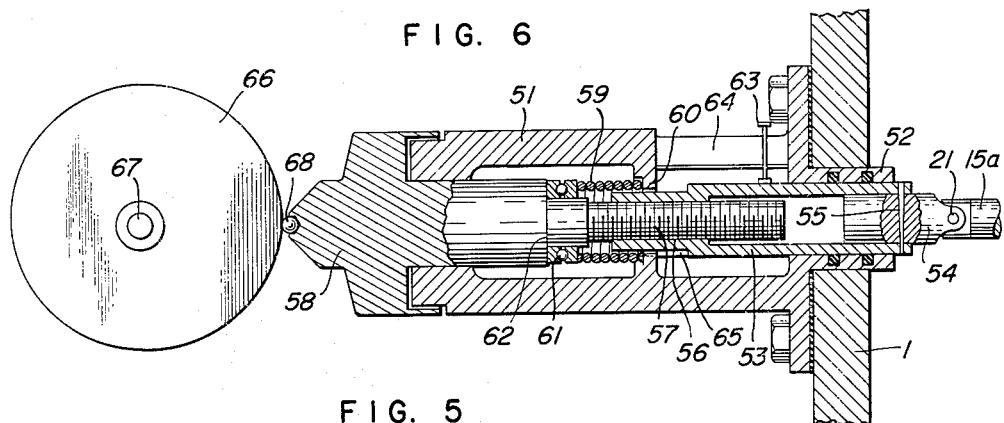
FIG. 6 is a section of a different embodiment of the adjusting mechanism.

In FIG. 6 there is shown another form of the invention. In this case, a rod 15a corresponding to the rod 15 of FIG. 3, is fastened to sleeve 5 in a similar manner. This rod, however, moves sleeve 5 both for the manual and the automatic adjustment by axial movements thereof. There is provided a casting 51 forming a bracket which is attached to the casting 1 and which has an extension 52 projecting into the casting 1. This extension forms a journal for a sleeve 53 that is attached to a stub shaft 54 by means of pin 55. The stub shaft and sleeve are joined to rod 15a by a joint 21 and, in effect, form a continuation thereof. Sleeve 53 has internal threads 56 adjacent to its left end and receives a threaded shaft 57 which is provided on its outer end with an enlargement 58 that serves as an adjusting knob. Bracket 51 has an internal collar 60 thereon which guides the inner end of sleeve 53 with a portion of this collar sliding in a keyway 65 to prevent rotation of the sleeve.

In order to adjust manually the sleeve 5 and thereby change the ratio of the air and gas supplied by the mixing machine, knob 58 is rotated. Such rotation produces axial movement of sleeve 53 and the parts attached thereto, so that rod 15a, of which the sleeve is an extension, will be moved axially to adjust part 5. If desired, an indicating means, of the type shown in FIG. 3, can be used to indicate the position of this rod and of the ratio of air and gas.

The entire adjusting mechanism described above is moved axially for automatic adjustment, as was the previously described embodiment. This is accomplished by having a spring 59 bias sleeve 53 and the parts attached thereto toward the left. It will be seen that one end of the spring bears against the collar 60 of bracket 51 while the other end bears against a portion of a bearing 61 that engages a shoulder 62 extending radially from an enlargement of shaft 57. The position of sleeve 53 and therefore the adjustment of the mixing machine, whether as a result of manual or automatic adjustment, is indicated by a pointer 63 that is fastened to the sleeve and which extends through a cut out portion 64 of the supporting bracket to cooperate with indicating marks on the exterior thereof. The spring biases the adjusting parts to the left against the action of a cam 66 mounted on a shaft 67. A friction reducing device, in the form of a ball 68, is mounted in the outer end of adjusting knob 58. It will be seen that, as shaft 67 is rotated, the cam will act in opposition to the spring in order to shift the parts and thereby adjust sleeve 5 and the air-gas ratio of the mixture produced by the mixing machine. Shaft 67 can be rotated in the same manner as was shaft 39 of FIG. 3.

From the above description it will be seen that there is provided an adjusting mechanism which can be used to adjust the ratio of the mixture produced by a mixing machine. This apparatus is capable of being adjusted manually to give a desired ratio and the entire manual mechanism is adjusted automatically in order to maintain the characteristics of the mixture constant as a result of some measurement made of the mixture.

While in accordance with the provisions of the statutes, we have illustrated and described the best form of embodiment of our invention now known to us, it will be apparent to those skilled in the art that changes may be made in the form of the apparatus disclosed without departing from the spirit and scope of the invention set forth in the appended claims, and that in some cases certain features of our invention may be used to advantage without a corresponding use of other features.

What is claimed is:

1. In combination, a machine for mixing a plurality of gases, said machine having a frame and including a rotatable part in said frame to adjust the ratio of the gases being mixed as said part is rotated, means to rotate said part including a rod, a nut threaded on said rod to move said rod axially as said rod is rotated or moved axially, means attaching said nut pivotably to said part whereby as said nut is moved axially said part will be rotated, a bracket fixed to said frame and having means therein to journal said rod for rotation and for axial movement, and an adjusting knob fixed to said rod and by means of which it can be rotated, means carried by said rod to indicate the rotative position thereof, a disc attached to and extending radially from said rod, resilient means extending between one side of said disc and a portion of said bracket to bias said rod and the parts carried thereby in one axial direction, cam means engaging the other side of said disc, means on said bracket to mount said cam means for adjustment relative thereto, and means to adjust said cam and thereby said disc to move said rod axially in an opposite direction.

2. In combination, a mixing machine for mixing a plurality of gases, said machine having a frame, a part mounted for rotation in said machine operative to adjust the ratio of the mixture of the gases as said part rotates, means rotating said part including a rod adjustably connected to said part and operative to rotate said part upon axial movement or rotation of said rod, an extension connected to said rod to move said rod as said extension is moved, a bracket mounted on said frame and in which said extension is journaled for rotating and axial movement, manually operable rotatable means rigidly connected to said extension and operable upon rotation thereof to rotate said such extension, said rod, and said part, means to bias said extension and rod in one direction axially of said bracket, cam means mounted in said bracket and operable to act on said extension to move it in opposition to said biasing means upon adjustment of said cam means, and power operated means to adjust said cam means and thereby shift said extension and the various elements connected thereto axially against the action of said biasing means.

3. Apparatus for use in a mechanism for mixing a plurality of gases, said mechanism including a frame and a part in said frame for adjusting the ratio of the mixture of gases upon movement of said part, a bracket attached to said frame, a rod journaled for rotation and axial movement in said bracket, threaded connecting means between said rod and part operable to move said part upon rotation or axial movement of said rod, manually operated means connected to rotate said rod in said bracket, a disc attached to said rod and projecting radially therefrom, resilient means between one side of said disc and said bracket operable to bias said rod axially in one direction, movable means movable in said bracket acting on said disc operative to move said rod and said manually operated means axially in opposition to said resilient means, and remotely controlled means to adjust said movable means.

References Cited by the Examiner
UNITED STATES PATENTS

| | | | |
|---|---|---|---|
| 1,786,894 | 12/30 | Brown | 137—625.32 X |
| 2,164,417 | 7/39 | McKee | 158—119 X |
| 2,486,017 | 10/49 | Furkert | 137—98 X |
| 2,496,586 | 2/50 | Kemp et al. | 137—98 |
| 2,961,005 | 11/60 | Ipsen | 137—625.41 |
| 2,989,849 | 6/61 | Torell et al. | 137—614.17 X |
| 3,033,463 | 5/62 | Doner et al. | 158—119 X |

M. CARY NELSON, *Primary Examiner.*